United States Patent
Osmun et al.

(10) Patent No.: US 12,123,338 B2
(45) Date of Patent: Oct. 22, 2024

(54) HYBRID PROXIMITY SEAL

(71) Applicant: Illinois Tool Works Inc., Glenview, IL (US)

(72) Inventors: Nathan C. Osmun, Edgerton, OH (US); Joseph D. Davis, Archbold, OH (US); Christopher A. Carns, Hicksville, OH (US)

(73) Assignee: Illinois Tool Works Inc., Glenview, IL (US)

(*) Notice: Subject to any disclaimer, the term of this patent is extended or adjusted under 35 U.S.C. 154(b) by 0 days.

(21) Appl. No.: 18/388,095

(22) Filed: Nov. 8, 2023

(65) Prior Publication Data

US 2024/0110502 A1    Apr. 4, 2024

Related U.S. Application Data

(60) Provisional application No. 63/423,669, filed on Nov. 8, 2022, provisional application No. 63/412,947, filed on Oct. 4, 2022.

(51) Int. Cl.
*F01P 7/16*    (2006.01)
*F16K 3/24*    (2006.01)
*F01P 7/14*    (2006.01)

(52) U.S. Cl.
CPC ........... *F01P 7/16* (2013.01); *F16K 3/243* (2013.01); *F01P 2007/146* (2013.01)

(58) Field of Classification Search
CPC .......... F01P 7/14; F01P 7/16; F01P 2007/146; F16K 3/24; F16K 3/243; G05D 23/00
See application file for complete search history.

(56) References Cited

U.S. PATENT DOCUMENTS

| 5,381,951 | A | * | 1/1995 | Michel | G05D 23/021 236/DIG. 2 |
| 5,494,005 | A | * | 2/1996 | Saur | G05D 23/134 123/41.1 |
| 9,394,824 | B2 | * | 7/2016 | Heldberg | F01P 7/14 |
| 9,695,734 | B2 | * | 7/2017 | Carns | F16K 5/0605 |
| 2010/0044606 | A1 | * | 2/2010 | Moench | F16K 31/043 137/625.49 |
| 2022/0034254 | A1 | * | 2/2022 | Quix | F01P 7/16 |

* cited by examiner

*Primary Examiner* — Grant Moubry
(74) *Attorney, Agent, or Firm* — McAndrews, Held & Malloy, Ltd.

(57) ABSTRACT

A thermostatic valve assembly for an internal combustion engine cooling system. The thermostatic valve assembly including a valve housing and a plunger assembly. The valve housing includes a chamber, an inlet port, a radiator output port, and a bypass output port. The bypass output port including a flow opening. The plunger assembly being slideably secured within the chamber and moving between a first position to close the flow opening and a second position to open the flow opening. The plunger assembly comprises a body and at least one seal configured to seal the flow opening when in the first position.

20 Claims, 4 Drawing Sheets

HYBRID PROXIMITY SEAL

CROSS-REFERENCE

The present application claims the benefit under 35 U.S.C. § 119(e) of U.S. Provisional Patent Application Nos. 63/412,947 and 63/423,669; each of which is entitled "Hybrid Proximity Seal." The contents of which are hereby incorporated by reference.

BACKGROUND

An internal combustion engine typically includes a cooling circuit configured to allow coolant, such as antifreeze or water, to flow through a radiator. A bypass conduit opens during a start phase of the engine and allows the coolant to circulate through the bypass conduit rather than the radiator. In general, a thermostatic valve system controls the flow of coolant.

The valves is configured such that, at a predefined temperature, the thermostatic valve is closed and the bypass valve is open. As the temperature increases, the thermostatic valve opens, and the bypass valve closes. Commonly owned U.S. Pat. No. 9,394,824, entitled "A Cooling System For A Combustion Engine" and U.S. Pat. No. 9,695,734, entitled "Cooling system for a combustion engine", each of which is hereby incorporated by reference in its entirety, provide further details of a cooling system.

Despite advancements, a need exists for an improved thermostatic valve assembly with improved sealing characteristics.

SUMMARY

The present disclosure relates generally to an improved thermostatic valve assembly with improved sealing characteristics, substantially as illustrated by and described in connection with at least one of the figures, as set forth more completely in the claims.

DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

DESCRIPTION

Figure 1A:
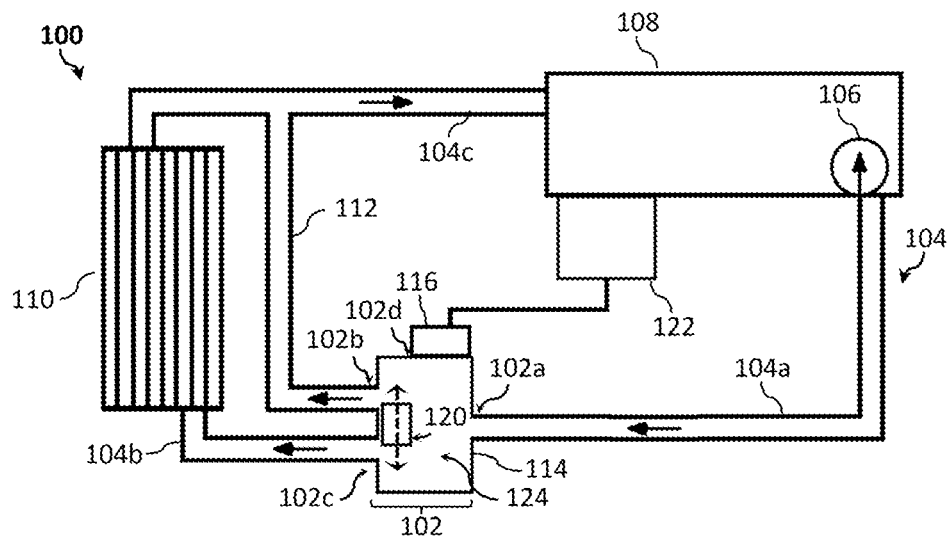
FIG. 1a illustrates a schematic diagram of an example internal combustion engine cooling system in accordance with aspects of this disclosure.

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within and/or including the range, unless otherwise indicated herein, and each separate value within such a range is incorporated into the specification as if it were individually recited herein. In the following description, it is understood that terms such as "first," "second," "top," "bottom," "side," "front," "back," and the like are words of convenience and are not to be construed as limiting terms. For example, while in some examples a first side is located adjacent or near a second side, the terms "first side" and "second side" do not imply any specific order in which the sides are ordered.

The terms "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the disclosure. The use of any and all examples, or exemplary language ("e.g.," "such as," or the like) provided herein, is intended merely to better illuminate the disclosed examples and does not pose a limitation on the scope of the disclosure. The terms "e.g.," and "for example" set off lists of one or more non-limiting examples, instances, or illustrations. No language in the specification should be construed as indicating any unclaimed element as essential to the practice of the disclosed examples.

The term "and/or" means any one or more of the items in the list joined by "and/or." As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y, and/or z" means "one or more of x, y, and z."

Disclosed is a thermostatic valve assembly for an internal combustion engine cooling system. In one example, the thermostatic valve assembly comprises a valve housing and a plunger assembly. The valve housing includes a chamber, an inlet port, a radiator output port, and a bypass output port. The bypass output port including a flow opening. The plunger assembly being slideably secured within the chamber and moving between a first position to close the flow opening and a second position to open the flow opening. The plunger assembly comprises a body and at least one seal configured to seal the flow opening when in the first position.

Figure 1B:
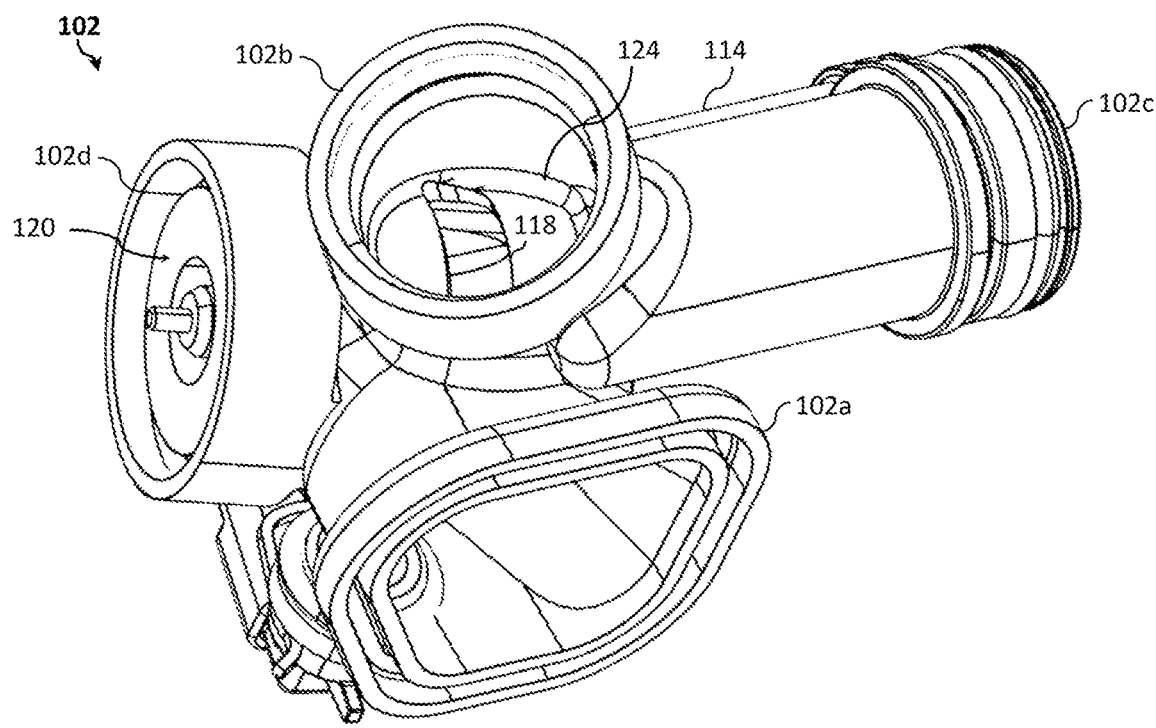
FIG. 1b illustrates a perspective view of an example thermostatic valve assembly in accordance with aspects of this disclosure.

FIG. 1a illustrates a schematic diagram of an internal combustion engine cooling system 100, while FIG. 1b illustrates a perspective view of an example thermostatic valve assembly 102 for use with the internal combustion engine cooling system 100. As best illustrated in FIG. 1a, the internal combustion engine cooling system 100 includes a cooling circuit 104 operatively connected to a coolant pump 106 of the internal combustion engine 108. The coolant pump 106 can be, for example, a water or antifreeze pump. The cooling circuit 104 includes a radiator 110, a thermostatic valve assembly 102, and one or more fluid conduits. The thermostatic valve assembly 102 is configured to interrupt and/or direct the flow of coolant through the cooling circuit 104 based on, for example, an operational status of the internal combustion engine 108 (e.g. temperature). The interruption may be carried out in a cold start phase so that the internal combustion engine 108 may be heated relatively quickly by bypassing the radiator 110.

As illustrated, the internal combustion engine 108 is in fluid communication with the radiator 110 and the thermostatic valve assembly 102 via the one or more fluid conduits. The one or more fluid conduits include, for example, a bypass conduit 112 to convey coolant from the thermostatic valve assembly 102 to the internal combustion engine 108 (bypassing the radiator 110), a first conduit 104a to convey coolant from the internal combustion engine 108 to the thermostatic valve assembly 102, a second conduit 104b to convey coolant from the thermostatic valve assembly 102 to the radiator 110, and a third conduit 104c to convey coolant to the internal combustion engine 108 from either the radiator 110 or the bypass conduit 112 (depending on the position of the thermostatic valve assembly 102). The cooling circuit 104 may be effectively shunted by the bypass conduit 112.

As best illustrated in FIG. 1a, the thermostatic valve assembly 102 includes a valve housing 114 defining a chamber 124, an inlet port 102a configured to couple with the first conduit 104a, a radiator output port 102c configured to couple fluidly with the second conduit 104b, a bypass output port 102b configured to couple fluidly with the bypass conduit 112, and an actuator port 102d configured to couple with the actuator 116. The bypass output port 102b includes a flow opening 118, which is illustrated as being generally oval in shape. While illustrated as generally oval in shape, other shapes are contemplated, including circular, quadrilateral (e.g., square or rectangular), etc.

The thermostatic valve assembly 102 includes a moving element, such as a plunger assembly 120, that is slideably secured within the chamber 124 defined by the thermostatic valve assembly 102. In the illustrated example, the plunger assembly 120 is configured to move (e.g., slide) between a first position and a second position within the chamber 124 via an actuator 116 to redirect fluid flow. For example, in the first position, the thermostatic valve assembly 102 fluidly couples the first conduit 104a to the second conduit 104b. When in the first position, the one or more flow openings 118 to the bypass conduit 112 are closed (i.e., sealed) by the sliding action of the plunger assembly 120. Sealing the one or more flow openings 118 is critical for proper radiator cooling function. Conversely, in the second position (i.e., bypass position), the thermostatic valve assembly 102 fluidly couples the first conduit 104a to the bypass conduit 112 by sliding the plunger assembly 120 to open the flow opening 118. When in the first position, coolant that is cooled by the radiator is provided to the internal combustion engine 108, while warm coolant (i.e., coolant that has not been run through the radiator 110) is provided to the internal combustion engine 108 when in the second position.

The actuator 116 can be operably coupled with an engine control unit 122 that is configured to control the actuator 116 to thereby move the plunger assembly 120 between the first position and second position. That is, the engine control unit 122 detects particular engine states, temperatures within the system, and the like. In operation, the coolant initially circulates by way of the thermostatic valve assembly 102 through the bypass conduit 112 such that the internal combustion engine 108 reaches operational temperature quickly. The flow opening 118 to the bypass conduit 112 can then be blocked by the thermostatic valve assembly 102 after the coolant reaches a predefined temperature (as determined by the engine control unit 122, for example). The second conduit 104b to the radiator 110 can then be opened to allow for cold coolant to flow from the radiator 110 into third conduit 104c as necessary to regulate temperature thereof.

Figure 2C:
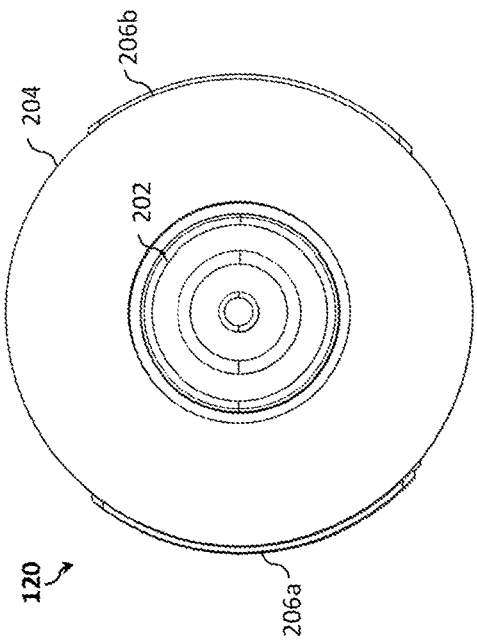
FIGS. 2c and 2d illustrate, respectively, top and bottom top plan views of the plunger assembly.
Figure 2D:
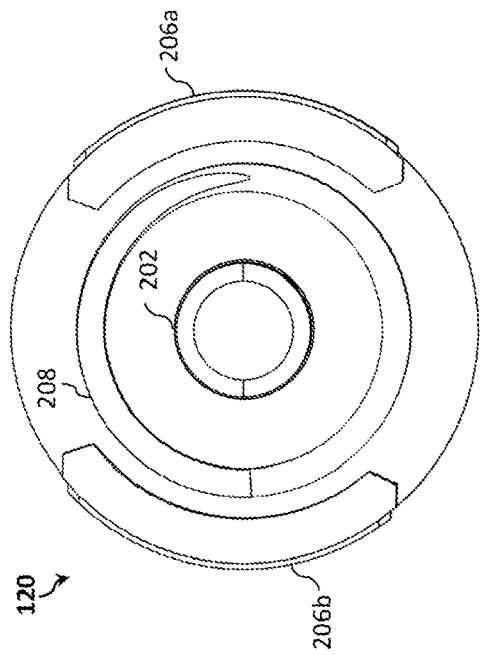
Figure 2A:
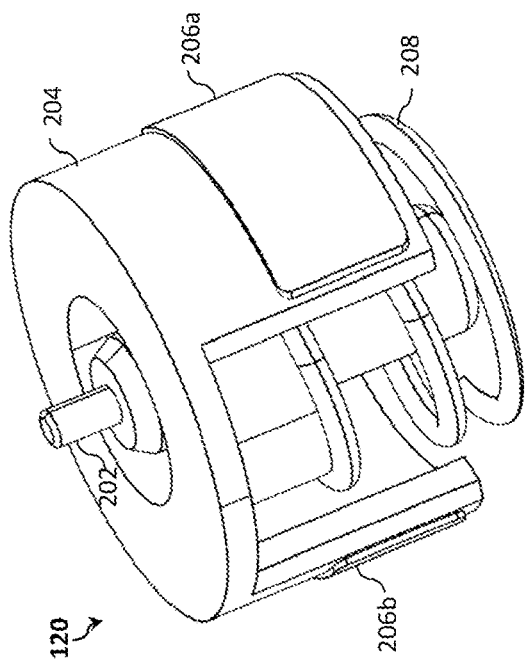
FIGS. 2a and 2b illustrate, respectively, top and bottom isometric views of the plunger assembly in accordance with aspects of this disclosure.
Figure 2B:
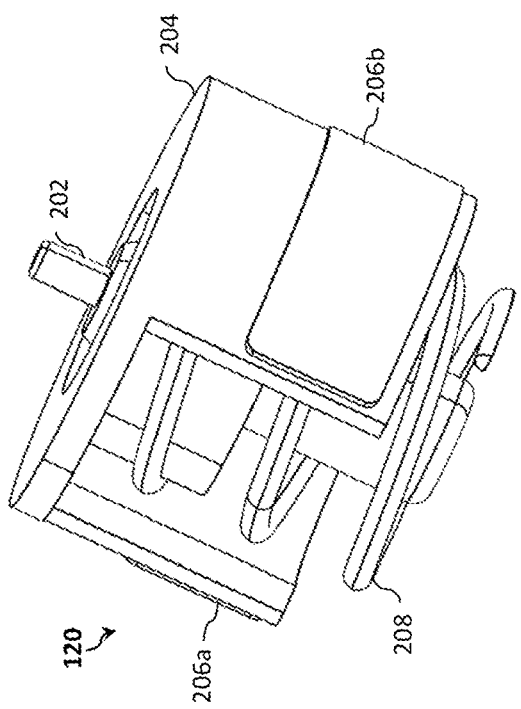
Figure 2E:
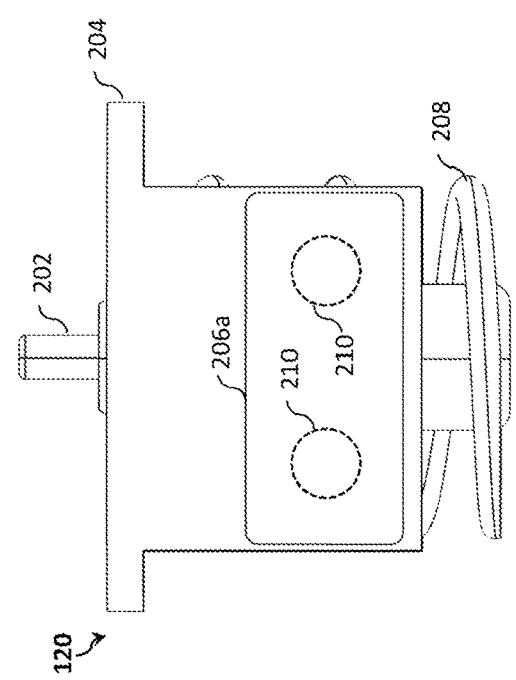
FIGS. 2e through 2h illustrate first, second, third, and fourth side views of plunger assembly.
Figure 2G:
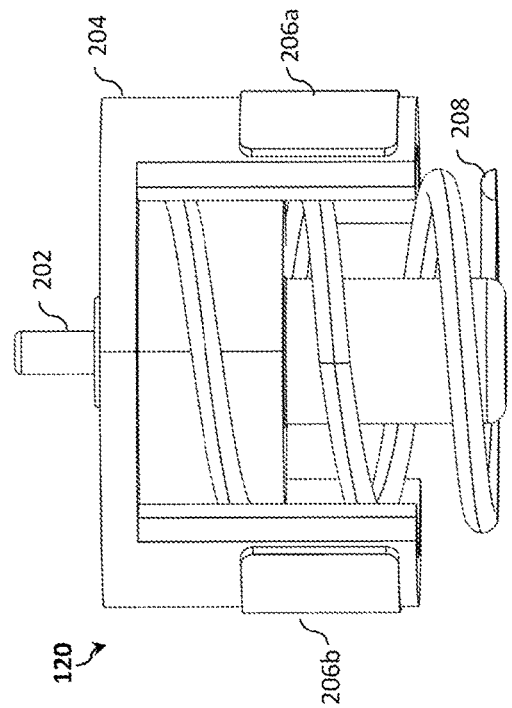
Figure 2F:
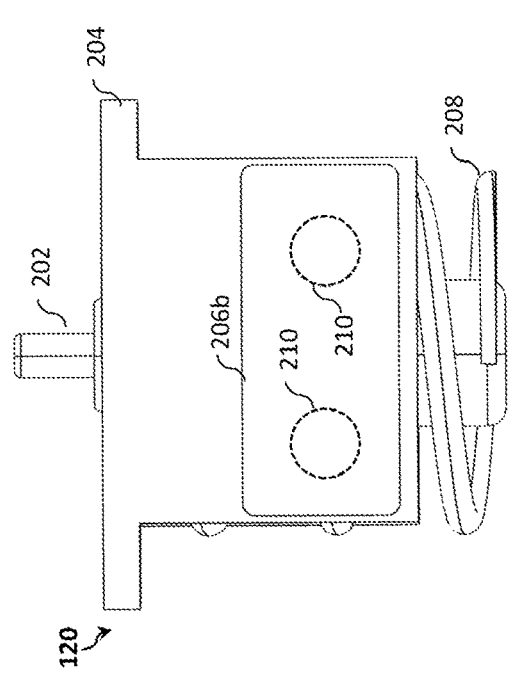
Figure 2H:
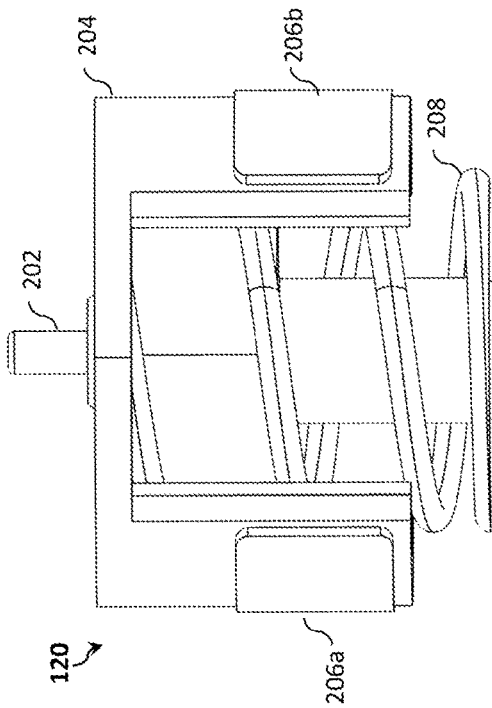
Figure 2I:
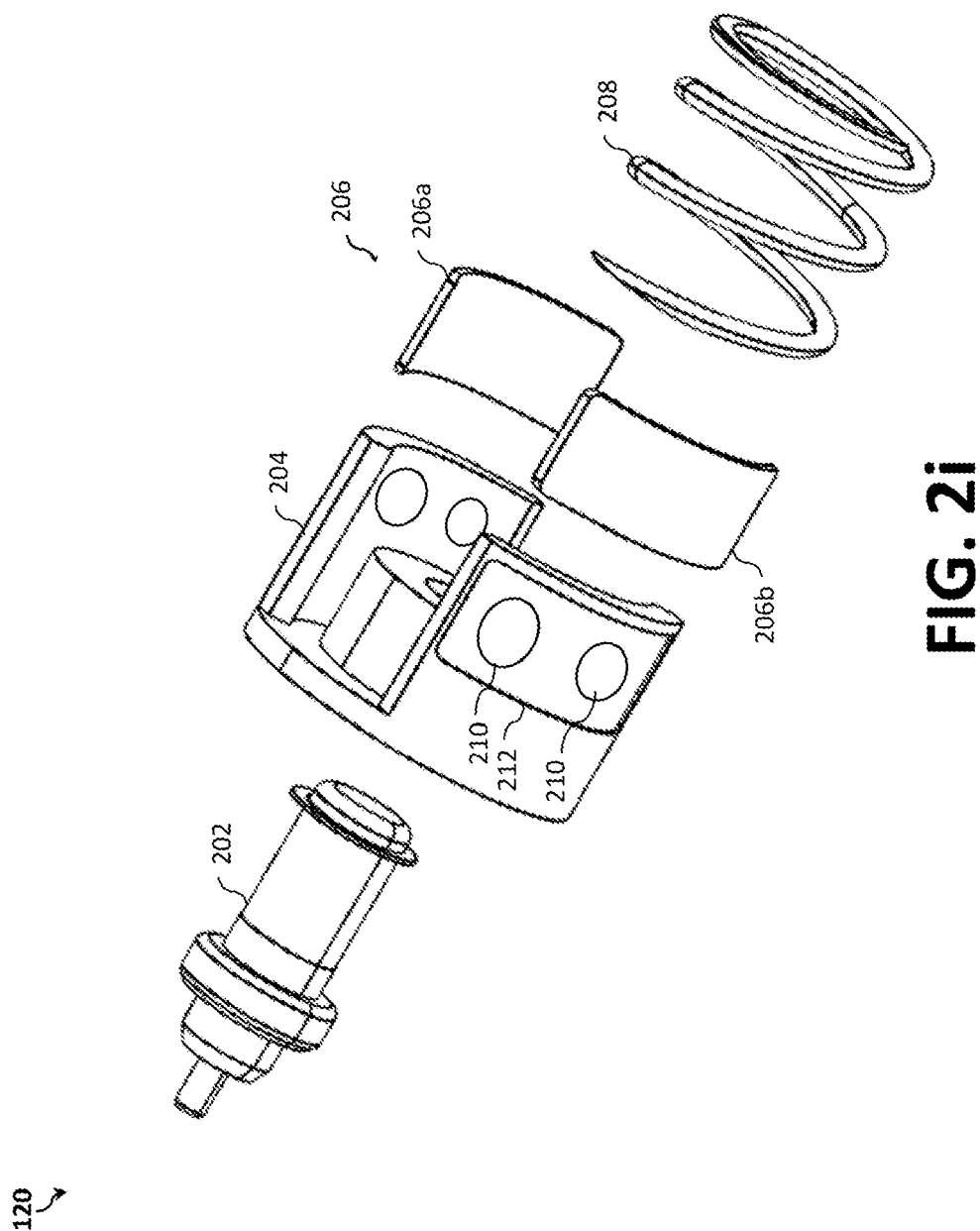
FIG. 2i illustrates an assembly view of the plunger assembly.

FIGS. 2a through 2h illustrate an assembled plunger assembly 120 in accordance with an aspect of this disclosure. Specifically, FIGS. 2a and 2b illustrate, respectively, top and bottom isometric views of the plunger assembly 120, while FIGS. 2c and 2d illustrate, respectively, top and bottom top plan views of the plunger assembly 120. FIGS. 2e through 2h illustrate first, second, third, and fourth side views of plunger assembly 120, while FIG. 2i illustrates an assembly view of the plunger assembly 120. In one example, the plunger assembly 120 generally comprises a plunger 202, a body 204 fixed to the plunger 202, one or more seals 206 coupled to or position adjacent the body 204, and a spring 208 configured to bias the body 204 toward an end of the chamber 114. In the illustrated example, the body 204 is substantially cylindrical and concentric with the plunger 202.

The body 204 may include or define one or more features configured to open and close the one or more fluid conduits in order to selectively prevent and allow fluid to flow therethrough. For example, the body 204 is illustrated as having a first seal 206a and a second seal 206b positioned on an exterior surface of the body 204 (e.g., the wall portion of the generally cylindrical body 204). The first seal 206a and the second seal 206a are sized and shaped such that they block the one or more flow openings 118 to the bypass conduit 112.

The one or more seals 206 can be fabricated using, for example, polytetrafluoroethylene (PTFE), thermoplastic vulcanizates (TPV) (e.g., Santoprene™) ethylene propylene diene monomer (EPDM) rubber, polypropylene (PP), or a combination thereof. The seals 206 can be configured to float within a recess 212 defined by the body 204. In other examples, the seals 206 can be connected to the body 204 at an edge or a corner. One or more holes 210 can be formed in the body 204 and positioned behind the seal(s) 206 (e.g., within the recess 212) to allow the hydraulic pressure within the internal combustion engine cooling system 100 (such as those resulting from the flow rate & system pressure) to increase the sealing ability of the plunger assembly 120 to thereby achieve a zero-leak seal (as compared to existing seals with a small controlled gap that allows 10-15 LPM flow). In other words, pressure within the chamber 124 causes pressurized air to pass through the one or more holes 210 to push or urge the seals 206 away from the body 204 and toward the corresponding one or more flow openings 118. The holes 210 illustrated in FIGS. 2e and 2f are drawn in broken lines to indicate that they are behind the first seal 206a and the second seal 206b, respectively. While only two holes 210 are illustrated, additional or fewer holes 210 can be employed. For example, a single hole 210 can be provided for each seal 206 or three of more holes 210 can be provided for each seal 206. Where a plurality of holes 210 are used, the plurality of holes 210 can be arranged to distribute the force evenly on each seal 206 and/or to direct the force to a specific area, such as the perimeter of the one or more flow openings 118, thus increasing the seal of the seal 206 at the perimeter of each flow opening 118.

The above-cited patents and patent publications are hereby incorporated by reference in their entirety. Where a definition or the usage of a term in a reference that is incorporated by reference herein is inconsistent or contrary to the definition or understanding of that term as provided herein, the meaning of the term provided herein governs and the definition of that term in the reference does not necessarily apply.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

The invention claimed is:

1. A thermostatic valve assembly (102) for an internal combustion engine cooling system (100), the thermostatic valve assembly (102) comprising:
   a valve housing (114) having a chamber (124), an inlet port (102a), a radiator output port (102c), and a bypass output port (102b), wherein the bypass output port (102b) includes a flow opening (118); and
   a plunger assembly (120) slideably secured within the chamber (124) and configured to move between a first position to close the flow opening (118) and a second position to open the flow opening (118),
      wherein the plunger assembly (120) comprises a body (204) and at least one seal (206) configured to seal the flow opening (118) when in the first position, and
      wherein the seal (206) is configured to float within a recess (212) defined by the body (204).

2. The thermostatic valve assembly (102) of claim 1, wherein the recess (212) comprises one or more holes (210).

3. The thermostatic valve assembly (102) of claim 1, wherein the seal (206) comprises a polytetrafluoroethylene (PTFE) material.

4. The thermostatic valve assembly (102) of claim 1, wherein the seal (206) comprises a thermoplastic vulcanizates (TPV) material.

5. The thermostatic valve assembly (102) of claim 1, wherein the recess (212) comprises two or more holes (210).

6. The thermostatic valve assembly (102) of claim 1, wherein the recess (212) comprises three or more holes (210).

7. A plunger assembly (120) for use in a valve housing (114) having a chamber (124) and a bypass output port (102b) that includes a flow opening (118), the plunger assembly (120) comprising:
   a body (204) defining a recess (212) that comprises one or more holes (210); and
   at least one seal (206) configured to seal the flow opening (118),
      wherein the plunger assembly (120) is configured to be slideably secured within the chamber (124) and configured to move between a first position to close the flow opening (118) and a second position to open the flow opening (118), and
      wherein the at least one seal (206) is configured to seal the flow opening (118) when in the first position.

8. The plunger assembly (120) of claim 7, wherein the seal (206) is configured to float within the recess (212).

9. The plunger assembly (120) of claim 7, wherein the seal (206) comprises a polytetrafluoroethylene (PTFE) material.

10. The plunger assembly (120) of claim 7, wherein the seal (206) comprises a thermoplastic vulcanizates (TPV) material.

11. The plunger assembly (120) of claim 7, wherein the recess (212) comprises two or more holes (210).

12. The plunger assembly (120) of claim 7, wherein the recess (212) comprises three or more holes (210).

13. A thermostatic valve assembly (102) comprising:
   a valve housing (114) having a chamber (124) and a flow opening (118); and
   a plunger assembly (120) positioned within the chamber (124) and configured to move between a first position to close the flow opening (118) and a second position to open the flow opening (118),
      wherein the plunger assembly (120) comprises a body (204) that defines a recess (212) with one or more holes (210), and
      at least one seal (206) configured to seal the flow opening (118) when in the first position.

14. The plunger assembly (120) of claim 13, wherein the seal (206) is configured to float within the recess (212).

15. The plunger assembly (120) of claim 13, wherein the seal (206) is positioned within the recess (212) and positioned between the one or more holes (210) and the flow opening (118).

16. The plunger assembly (120) of claim 15, wherein the one or more holes (210) are configured to provide pressure from within the body (204) to push or urge the seal (206) against an interior surface of the chamber (124) at, adjacent, or surrounding the flow opening (118).

17. The plunger assembly (120) of claim 13, wherein the recess (212) comprises two or more holes (210).

18. The thermostatic valve assembly (102) of claim 17, wherein the recess (212) comprises three or more holes (210).

19. The thermostatic valve assembly (102) of claim 13, wherein the seal (206) comprises a polytetrafluoroethylene (PTFE) material.

20. The thermostatic valve assembly (102) of claim 13, wherein the seal (206) comprises a thermoplastic vulcanizates (TPV) material.

* * * * *